United States Patent Office 3,394,045
Patented July 23, 1968

3,394,045
POLYPROPYLENE SHEET AND METHOD
Russell J. Gould, Arlington Heights, Ill., assignor to Signode Corporation, a corporation of Delaware
No Drawing. Filed July 27, 1964, Ser. No. 385,447
8 Claims. (Cl. 161—164)

ABSTRACT OF THE DISCLOSURE

This invention deals with the method of treatment of high strength polypropylene films, tapes and sheets having an oriented macromolecular structure to impart abrasion resistance. The method involves working extruded polypropylene material to produce an oriented structure and then heating the surface layers of the worked polypropylene to a fusing temperature in the range between 425° F. and 525° F. whereby a surface layer of at least 1 mil depth is formed which is free of planar oriented macromolecular structure.

---

This invention relates to stressed products prepared from synthetic linear condensation polymers of olefins. More particularly, it relates to a process for the production of sheets, films, tapes and strapping material having a high degree of molecular orientation. Still more particularly, it releates to straps of oriented polypropylene resin having relatively high tensile strength and resistance to abrasion.

The present invention comprises a method of producing sheets, films, tapes, package wrapping straps, and the like, from crystallizable polypropylene which have been worked to obtain planar orientation of the macromolecular chains and improved tensile strength over that of unoriented polymers wherein flash-heating the surface of the products effects fusion of the surface layer and the products have imparted thereto a resistance to abrasion.

Polypropylene resin has been converted into useful forms by such methods as the bubble procedure to produce thin films stretched to effect a molecular orientation. It is also known that linear crystallizable poly-alpha olefins can be rolled and the rolled products will exhibit an improvement in mechanical characteristics in the rolling direction without causing a noticeable decrease in the tear strength in that direction or in the other mechanical properties transverse to that direction.

While molecular orientation of poylpropylene resin improves, for example, the strength, creep resistance, etc., the orientation also introduces susceptibility to abrasion or scuffing. The greater the degree of orientation, the greater it is susceptible to abrasion. This susceptibility is peculiar because it is a uni-directional phenomena, i.e., it is exhibited when rubbing is directed longitudinally along the surface of a film in one direction and does not occur when rubbing is directed in the opposite direction. This susceptibility to abrasion action is troublesome because it manifests itself by forming balls of fiber which interfere with the operation of, for example, strapping tools. It also results in rapid weakening of strap on packages in transit when applied to a package so as to run parallel to the direction of movement.

Lubricants such as calcium stearate, zinc stearate and the like, known to impart slippage to resin films, when incorporated into the polypropylene resins, failed to increase the resistance to abrasion. Surface lubrication of the films with wax or wax emulsions temporarily alleviates the abrasion problem but once the wax is worn through, the abrasion action is resumed.

Now it has been discovered that polypropylene sheets, straps, films, etc., may be produced with increased tensile strength and strong planar orientation of the macromolecular chains without being susceptible to deleterious abrasion. This abrasion resistance is developed when, for example, the polypropylene sheet, which has been worked to develop improved strength, is subjected at its surface to flash-heating to effect a fusion of the surface layer.

More in detail, the method of producing the films and tapes, etc., from linear crystallizable polypropylene comprises the steps of subjecting polypropylene film to working, i.e., to compression to reduce the cross-sectional thickness and/or to stretching in the longitudinal direction to improve the mechanical properties and heating the surface of the worked polypropylene sheet to effect a fusion of a surface layer, for example, a layer of between 0.001" and 0.003" thickness (1 to 3 mils.).

In the preparation of polypropylene sheet, films, strap, etc., the preferred procedure is to subject extruded propylene sheet to rolling to accomplish a cross-sectional reduction while maintaining critical temperature and pressure conditions and then to stretch the film by tensioning of a critical magnitude before the sheet being processed cools appreciably from the critical temperature of rolling. The sheet prepared under these conditions exhibits increased tensile strength over that of unstressed material, improved creep strength and break characteristics under tensioning similar to that of metals, i.e., elongation followed by a relatively clean transverse break or separation. The strengthened sheet is subsequently subjected to flash-heating so that the surface attains the temperature in the range preferably between 425° F. and 525° F. Such flash-heating may be applied to polypropylene sheet after it passes the tensioning rolls and before it cools appreciably from the temperature at which the sheet is rolled and tensioned or it may be performed as a separate operation on sheet cooled to room temperature.

Workpieces useful in the preparation of polypropylene products of this invention are prepared by extrusion.

In extruding a workpiece, an extrusion die of any configuration, or size, may be used. Preferably, the workpiece is extruded in the form of sheets of any desired thickness exceeding that of the desired final product. A typical extruded sheet for use in the preparation of straps will be of the order of 13 inches wide and ⅜ of an inch thick. This size workpiece will eventually result in production of 20 straps of approximately ½ inch width, as will be described hereinafter.

Polypropylene being extruded at a temperature in the range between about 400° F. and 550° F. as it passes through the extrusion die, may consist solely of resin or it may contain pigments, plasticizers, fillers, antioxidants, dyes, ultraviolet light scavengers, and the like.

To produce sheet material of uniformity rendering it acceptable for processing in accordance with hereinafter specified conditions, an extruded sheet of, for example, ⅜ inch thickness, is subjected to the action of chill rolls and calendering rolls, which set an intermediate sheet thickness of between about two and about seven times the gauge thickness of the desired final product.

Working of this intermediate sheet of polypropylene to make products of relatively high tensile strength but having the disadvantage of linear orientation such that the sheet will be susceptible to abrasion, may be accomplished by rolling which subjects the sheet to compression stresses which cause the polymer to flow in definite directions or a rolling operation coupled with a stretching process.

In the production of relatively high tensile polypropylene, the preferred procedure is to pass intermediate thickness sheet material to mill rolls which make a critical reduction in the cross-sectional thickness thereof. This reduction is from a size which is between about two and about seven times the desired sheet thickness to a thickness in the range between about 0.01 inch and 0.03 inch. In making this cross-sectional size reduction, the polypropylene sheet is moved through a gap between mill rolls which generally is of the order of 50% to 75% of the thickness desired for the final product. For example, when processing sheet to produce 3500 feet per hour of 10 inch wide sheet of 0.015 inch or 15 mils thickness, a gap between mill rolls in the range between 0.008 inch (8 mils) and 0.01 inch (10 mils) will generally be used.

To accomplish the cross-sectional reduction, the intermediate polypropylene sheet is passed through mill rolls while the sheet is maintained at the temperature in the range hereinafter discussed.

When the intermediate sheet is being reduced in cross-sectional thickness, it is necessary to lubricate the sheet and to control the temperature of the sheet. These operations may be independent or may be carried out simultaneously. Simultaneous lubrication and temperature control are effected generally by cascading oil coolant over the rolls. This lubricating oil is maintained at a temperature between 100° F. and 250° F., preferably in the range between about 190° F. and 220° F. For the purposes of this invention, a suitable hydrocarbon oil, such as kerosene, light mineral oil, etc., may be used.

Strength is built into the polypropylene sheet, strap, etc., by orienting the crystalline structure through stretching the sheet. If the orientation is too great along any one axis, the sheet loses instead of gaining strength. In stretching the sheet, it has been determined that lower tensions produce less transverse brittleness and, accordingly, it is preferred that the effects, i.e., power input for tensioning to be less than that required for rolling.

The force necessary to produce an appreciable increase in the tensile strength of the sheet issuing from the mill rolls is in the range between about 50 pounds and 350 pounds per inch of width of sheet, preferably in the range between about 90 pounds and 150 pounds per inch.

When the sheet is stretched under the optimum conditions, tensile strengths in the range of 40,000 p.s.i. to 65,000 p.s.i. are developed by sheet produced on a continuous basis.

Sheet of tensile strength in the range of 40,000 p.s.i. to 65,000 p.s.i. and having an elongation in the range of 6% to 20% produce excellent products for use as ligatures or strapping employed in the packaging of materials where such strapping is placed around the package to be secured and, by the use of suitable tools, drawn tight and the overlapping ends secured together by crimping or other suitable means.

Sheet material obtained following tensioning may be moving at a speed in the range of 40 feet to 125 feet per minute. This moving sheet may be heat treated on both surfaces simultaneously or first on one side and then on the other. In this heat treatment, a surface layer of the sheet, film or strapping is raised to a fusion temperature, generally, in the range betwen about 375° F. and about 525° F. The surface layer may be fused for a depth of up to about 3 mils but generally the fused layer attains a thickness of only about 1 mil. This heating may be accomplished by impingement of gas flames on the polypropylene sheet surface or by other suitable flash-heating techniques such as contacting the polypropylene with gas flame-heated rolls or hot flat iron or by passing the sheet adjacent to infrared radiant heaters.

After flash-heating, the sheet material may be moved in air for a distance allowing the film to cool and to solidify or the sheet may be passed over chill rolls maintained at a temperature of approximately 150° F.

Sheet material obtained following flash-heating may be passed through a slitter, i.e., the work zone of a wheel having a multiplicity of spaced cutting discs, which will produce straps with edges that are clean and free of burrs. Such individual straps are taken up on reels.

The invention will be further understood from the following example which is given by way of illustration and without any intention that the invention be limited to the specfic conditions set forth.

Example

Strap was prepared by feeding to the melting pot of a conventional plastic extruder 335 pounds per hour of isotactic polypropylene granules. In the melting pot, the polypropylene was rendered plastic or flowable by heating to approximately 490° F. The plastic polypropylene was subjected to a pressure of approximately 2000 p.s.i. to extrude a workpiece of 13 inch width and 0.165 inch thickness. The extruded workpiece was passed between chill rolls maintained at a temperature of approximately 150° F.

The solidified sheet was passed between mill rolls having a gap of 0.02 inch between the 8 inch rollers. Oil coolant maintained at a temperature of 195° F. was cascaded over the mill rolls and recirculated. The excess oil carried by the sheet was removed by wipers, glass fiber wicks or other suitable wiping devices.

The wiped sheet was moved forward over a series of rolls operating at higher speed than the mill rolls so as to maintain a tension of 310 pounds per inch of width of sheeting on the polypropylene sheeting issuing from the mill roll.

When the sheeting has been passed through the tensioning rolls, it has a final thickness of 0.025 inch and has been reduced in width to approximately 10 inches. The tensile strength of the sheet was approximately 48,000 pounds per square inch.

The polypropylene sheet being produced at a rate of 3500 feet per hour or 10 feet of 10 inch wide sheet per pound of resin was passed between opposed gas flames adapted to contact the top and bottom surface of the sheet and raise the surface to a temperature of approximately 475° F. Polypropylene sheet moving at the above rate has the surface thereof fused to a depth of approximately 1 mil.

After passage over chill rolls maintained at a temperature of 150° F., the polypropylene sheet was passed through a slitter which produces 20 straps of approximately ½ inch width. Such straps are taken up on continuous reels.

The resultant straps had an average tensile strength of 48,000 pounds per square inch.

The foregoing description is given for clearness of understanding only and no unnecessary limitations should be understood therefrom, for some modifications will be obvious to those skilled in the art.

I claim:

1. The method of producing abrasion resistant polypropylene sheet material from crystallizable polypropylene sheet material which has been mechanically worked to obtain a planar orientation of the macromolecular chains comprising flash-heating a surface of the mechanically worked polypropylene sheet at a temperature in the range of between 375° F. and 525° F. for a sufficient time to cause fusion in the surface of said sheet to a depth of at least one mil but insufficient to cause fusion in the entire thickness of the sheet and cooling the heated surface to solidify the same.

2. The method of producing abrasion resistant polypropylene sheet material from crystallizable polypropylene sheet material which has been mechanically worked to obtain a planar orientation of the macromolecular chains comprising flash-heating two opposed surfaces of the mechanically worked polypropylene sheet material to a temperature in the range between about 375° F. and about 525° F. for a sufficient time to effect fusion of the opposed surfaces to a depth in the range between about 1 and about 3 mils but insufficient to cause fusion in the entire thickness of the sheet and cooling the heated surfaces to solidify the same.

3. The method of producing abrasion resistant sheet from linear crystallizable polypropylene sheet material which comprises subjecting crystallizable polypropylene sheet of a cross-sectional thickness at least double that of the thickness desired for the final product, to compression by passing it between heated compression rollers causing flow in the longitudinal direction and production of a sheet of reduced cross-sectional thickness, cooling the polypropylene while under compressive forces to a temperature in the range between about 100° F. and 250° F. and while the sheet of reduced cross-sectional thickness is at approximately the temperature of compression rolling, stretching said sheet through application in the longitudinal direction of a tensioning force in the range between about 50 and 350 pounds per inch of width of sheet to obtain a polypropylene sheet having planar molecular orientation of the macromolecular chains and flash-heating a surface of the stretched polypropylene sheet at a temperature in the range of between 375° F. and 525° F. for a sufficient time to cause fusion in the surface of said sheet to a depth in the range between about 1 and about 3 mils but insufficient to cause fusion in the entire thickness of the sheet and cooling the heated surface to solidify the same.

4. The method of producing abrasion resistant sheet from linear crystallizable polypropylene sheet material which comprises subjecting crystallizable polypropylene sheet of a cross-sectional thickness at least double that of a thickness in the range between 0.01 inch and 0.1 inch desired for the final product, to compression by passing it between heated compression rollers causing flow in the longitudinal direction and production of a sheet of reduced cross-sectional thickness, cooling the polypropylene while under compressive forces to a temperature in the range between about 100° F. and 250° F. and while the sheet of reduced cross-sectional thickness is at approximately the temperature of compression rolling, stretching said sheet through application in the longitudinal direction of a tensioning force in the range between about 50 and 350 pounds per inch of width of sheet to obtain a polypropylene sheet having planar molecular orientation of the macromolecular chains and flash-heating a surface of the stretched polypropylene sheet at a temperature in the range of between 375° F. and 525° F. for a sufficient time to cause fusion in the surface of said sheet to a depth in the range between about 1 and about 3 mils but insufficient to cause fusion in the entire thickness of the sheet and cooling the heated surface to solidify the same.

5. The method of producing abrasion resistant sheet from linear crystallizable polypropylene sheet material which comprises subjecting crystallizable polypropylene sheet to compressive forces by passing it between heated compression rollers to cause a flow in the longitudinal direction and to produce a sheet of reduced cross-sectional thickness in the range between about one half and about one seventh of the original sheet thickness, cooling the polypropylene during the compression action to a temperature in the range between about 100° F. and 250° F. and while the sheet of reduced cross-sectional thickness is at approximately the temperature of compression rolling, stretching the sheet by application in the longitudinal direction of a tensioning force in the range between about 50 and 350 pounds per inch of width of sheet to obtain a polypropylene sheet having planar molecular orientation of the macromolecular chains and flash-heating a surface of the stretched polypropylene sheet at a temperature in the range of between 425° F. and 525° F. for a sufficient time to cause fusion in the surface of said sheet to a depth in the range between about 1 and about 3 mils but insufficient to cause fusion in the entire thickness of the sheet and cooling the heated surface to solidify the same.

6. The method of producing abrasion resistant sheet from linear crystallizable polypropylene sheet material which comprises subjecting crystallizable polypropylene sheet to a compressive force by passing it between heated compression rollers to cause a flow in the longitudinal direction and to produce a sheet of cross-sectional thickness reduced to less than half its original cross-sectional thickness, cooling the polypropylene while under compressive forces to a temperature in the range between about 190° F. to 220° F. and while the sheet of reduced cross-sectional thickness is at approximately the temperature of compression rolling stretching said sheet by application in the longitudinal direction of a tensioning force in the range between about 50 and 350 pounds per inch of width of sheet to obtain a polypropylene sheet having planar molecular orientation of the macromolecular chains and flash-heating a surface of the stretched polypropylene sheet at a temperature in the range of between 425° F. and 525° F. for a sufficient time to cause fusion in the surface of said sheet to a depth in the range between about 1 and about 3 mils but insufficient to cause fusion in the entire thickness of the sheet and cooling the heated surface to solidify the same.

7. The method of producing abrasion resistant sheet from linear crystallizable polypropylene which comprises melting isotactic polypropylene by heating to approximately 490° F., extruding a polypropylene workpiece by subjecting the plastic polypropylene to a pressure of approximately 2000 pounds per square inch in the form of a workpiece of approximately 13 inch width and 0.165 inch thickness, passing the workpiece between mill rolls maintained at a temperature of approximately 150° F., subjecting the polypropylene workpiece to compression by passage between mill rolls having a gap of 0.02 inch, cooling the polypropylene while passing between the mill rolls to a temperature of approximately 195° F. by cascading oil coolant over the mill roll and workpiece, wiping excess coolant from the polypropylene sheet, stretching the sheet by application of a tensioning force of 310 pounds per inch of width of sheet whereby a sheet of a thickness of 0.025 inch and planar orientation of the macromolecular chains is obtained and flash-heating a surface of the stretched polypropylene sheet at a temperature in the range of between 425° F. and 525° F. for a sufficient time to cause fusion in the surface of said sheet to a depth in the range between about 1 and about 3 mils but insufficient to cause fusion in the entire thickness of the sheet and cooling the heated surface to solidify the same.

8. An abrasion resistant polypropylene sheet of a thickness in excess of 1 mil and any width having the inner portion thereof set with a planar orientation of the macromolecular chains and an outer portion thereof free of planar oriented macromolecular chains, which is the result of fusing the polypropylene sheet to a depth of at least 1 mil from the surface by heating to a temperature in the range between about 375° F. and 525° F. and then solidifying the fused material, the thickness of said outer portion being substantially less than the total thickness of the sheet.

References Cited
UNITED STATES PATENTS

| | | | | |
|---|---|---|---|---|
| 3,112,300 | 11/1963 | Natta et al. | | 260—93.7 |
| 2,746,084 | 5/1965 | Kreidl | | 264—80 |
| 3,223,764 | 12/1965 | Kahn et al. | | 264—210 |
| 3,257,490 | 6/1966 | Hovermale et al. | | 264—210 |
| 3,309,452 | 3/1967 | Yumoto et al. | | 264—289 |

ROBERT F. BURNETT, *Primary Examiner.*

W. J. VAN BALEN, *Assistant Examiner.*